United States Patent
Hsiao et al.

(10) Patent No.: US 8,848,118 B1
(45) Date of Patent: Sep. 30, 2014

(54) 3D DISPLAY DEVICE AND PHASE RETARDER FILM THEREOF

(75) Inventors: Chia-chiang Hsiao, Shenzhen (CN); Chih-wen Chen, Shenzhen (CN)

(73) Assignee: Shenzhen China Star Optoelectronics Technology Co. Ltd., Shenzhen (CN)

( * ) Notice: Subject to any disclaimer, the term of this patent is extended or adjusted under 35 U.S.C. 154(b) by 0 days.

(21) Appl. No.: 13/581,480

(22) PCT Filed: May 30, 2012

(86) PCT No.: PCT/CN2012/076248
§ 371 (c)(1),
(2), (4) Date: Aug. 28, 2012

(87) PCT Pub. No.: WO2013/174027
PCT Pub. Date: Nov. 28, 2013

(30) Foreign Application Priority Data

May 21, 2012 (CN) .......................... 2012 1 0157519

(51) Int. Cl.
| G02F 1/1335 | (2006.01) |
| G02F 1/136 | (2006.01) |
| G02F 1/1333 | (2006.01) |
| G02F 1/1362 | (2006.01) |
| G02B 27/22 | (2006.01) |
| G02F 1/13363 | (2006.01) |

(52) U.S. Cl.
CPC .......... *G02B 27/22* (2013.01); *G02F 1/133512* (2013.01); *G02F 1/136286* (2013.01); *G02F 1/13363* (2013.01)
USPC ................ 349/15; 349/117; 349/44; 349/110

(58) Field of Classification Search
CPC .......... G02F 1/13363; G02F 1/133634; G02F 1/136227; G02F 1/133512; G02F 1/136209; G02F 2001/133388; G02B 27/26; G02B 27/2714; G02B 5/3083; H04N 13/0404
USPC ...................... 349/15, 117, 44, 110
See application file for complete search history.

(56) References Cited

U.S. PATENT DOCUMENTS

2010/0110046 A1* 5/2010 Chen et al. .................... 345/204

* cited by examiner

*Primary Examiner* — Mike Qi
(74) *Attorney, Agent, or Firm* — Mark M. Friedman

(57) ABSTRACT

The present invention discloses a 3D display device and a phase retarder film thereof. The phase retarder film is used to be mounted on a liquid crystal display panel adopting a half-source driving structure and includes a plurality of phase retarder rows arranged side by side. Each phase retarder row has two wave-shaped sides, and each wave-shaped side corresponds in position to one shading row of a black matrix of the liquid crystal display panel. When the phase retarder film is mounted with a positional error, adjacent pixel electrodes in the same pixel row can have the same light-passing area relative to the phase retarder rows having wave-shaped sides so as to avoid a color washout problem.

13 Claims, 8 Drawing Sheets

3D DISPLAY DEVICE AND PHASE RETARDER FILM THEREOF

BACKGROUND OF THE INVENTION

1. Field of the Invention

The present invention relates to a 3D image display technology, especially to a 3D display device and a phase retarder film thereof.

2. Description of the Related Art

Because there is a distance between two eyes of a person, each of the eyes watches an object from a different direction. Therefore, a 3D display device uses human interocular difference to provide different images to the eyes, respectively, to generate a three-dimensional effect.

With reference to FIG. 1, a conventional 3D display system is disclosed and has a phase retarder film constituted by a patterned half-wave phase retarder layer 90 and a quarter-wave phase retarder layer 91 and mounted on a light-exiting surface of a liquid crystal display panel so as to output images having different polarization directions to an observer; and the observer wears a pair of polarized glasses 7 to receive the images having one polarization direction with his left eye and receive the images having another polarization direction with his right eye so as to create three-dimensional images in his brain. Generally speaking, the liquid crystal display panel of the 3D-display system uses images displayed by odd (or even) pixel rows as left-eye input images and images displayed by the other pixel rows as right-eye input images.

With reference to FIG. 1, images of the liquid crystal display panel of the 3D-display system will first travel through a polarizer to become linearly polarized images 80. The linearly polarized images 80 then travel through the patterned half-wave phase retarder film 90. Lights of the linearly polarized images will be separated into two sets of linearly polarized images 81 with mutually perpendicular polarization directions. The two sets of linearly polarized images 81 then travel through the quarter-wave phase retarder film 91 and output images 82 including left-handed circularly polarized images and right-handed circularly polarized images for being the left-eye input images and right-eye input images. Each of the lenses 71, 72 of polarized glasses 7 worn by the observer is constituted by a quarter-wave plates and a polarizer. The left-handed circularly polarized images and right-handed circularly polarized images 82 first travel through the quarter-wave plates of the lenses 71, 72 to be converted into linearly polarized images and then travel through the polarizers of the lenses 71, 72 and arrive at the left and right eyes, respectively. Because the polarizers of the lenses 71, 72 have different polarization directions, the user's left eye can only see the left-eye input images and the right eye can only see the right-eye input images. Hence, it can achieve a three-dimensional effect.

With reference to FIG. 2, FIG. 2 is a partial schematic view of a phase retarder film correspondingly mounted on a liquid crystal display panel of a conventional 3D display system. The liquid crystal display panel of the conventional display system includes a plurality of gate lines 51, a plurality of data lines 50 being crossed with the gate lines 51 and a plurality of pixel region being defined by the gate lines 51 and the data lines 50. Each one of the pixel regions has a thin-film transistor and a pixel electrode 52 mounted therein. The pixel regions are divided into a plurality of pixel rows. The phase retarder film 60 has a plurality of first phase retarder areas 60A and a plurality of second phase retarder areas 60B, wherein the first phase retarder areas 60A and the second phase retarder areas 60B are alternately arranged and have different liquid crystal orientations. Borders between the adjacent first phase retarder areas 60A and the second phase retarder areas 60B of the phase retarder film are respectively positioned between the adjacent pixel rows, and the borders between the adjacent first phase retarder areas 60A and the second phase retarder areas 60B are covered by black matrix 53 between the adjacent pixel rows.

With further reference to FIG. 3, since the cost of source driving circuits is higher than that of gate driving circuits, in order to reduce the use of source driving circuits, another conventional 3D display system adopts a pixel driving structure with half-source driver circuits. In the half source driver circuits, the number of the data lines 50 used in the source driving circuits is cut by half and each of the original gate line 51 is doubled to two gate lines 51a, 51b. Hence, the cost can be reduced while maintaining the same number of pixels by reducing the number of data lines in the source driving circuits.

However, in the pixel driving structure of half-source driving circuits shown in FIG. 3, when one of the pixel electrodes 52 is connected to a thin-film transistor which is positioned at an upper side of the pixel electrode 52, the adjacent pixel electrode 52 is connected to another thin-film transistors which is positioned at a lower side of this adjacent pixel electrode 52. Because space for each of the pixel region is fixed, two of the pixel electrodes 52 adjacent to each other in the same pixel row differ in light-exiting position. In order to cover the gate lines 51, the data lines 50 and the thin-film transistors, as shown in FIG. 4, the black matrix 53 will have regular convexity portions formed at two opposite sides of each gate line 51 and corresponding to the positions of the thin-film transistors for correspondingly covering those thin-film transistors. Thus, when mounting the phase retarder film 60 shown in FIG. 2, if a positional error unfortunately occurs, as shown in FIG. 5, the pixel electrodes 52 adjacent to each other in the same pixel row will differ in light transmittance area, and this will create a color washout problem for the 3D display system.

Therefore, it is necessary to provide a 3D display device and a phase retarder film thereof to overcome the problems existing in the conventional technology.

SUMMARY OF THE INVENTION

In view of the shortcomings of the conventional technology, the main objective of the invention is to provide a 3D display device and a phase retarder film that can avoid a color washout problem when the phase retarder film is mounted with a positional error.

In order to achieve the foregoing object of the present invention, the present invention provides a 3D display device comprising:

a liquid crystal display panel adopting a half-source driving structure and comprising:
- a pixel array including a plurality of pixel rows arranged side by side at intervals; and
- a black matrix including a plurality of shading rows, and the shading rows respectively correspond in position to the intervals between the adjacent pixel rows, and each of the shading rows has two parallel sides, and each of the parallel sides has a plurality of protrusions protruding out therefrom; and a phase retarder film mounted on the liquid crystal display panel and includes a plurality of phase retarder rows arranged side by side, wherein each of the phase retarder rows has two wave-shaped sides that each wave-shaped side corresponds in position to one of the shading rows of the black matrix, and each wave-shaped side has peaks and troughs, and the peaks of the wave-shaped side are positioned at the protrusions of one of the sides of the corresponding shading row; and the troughs of the wave-shaped side are positioned at the protrusions of the other one of the sides of the corresponding shading row.

In one embodiment of the present invention, each of the pixel rows includes a plurality of sub-pixel units, and each of the sub-pixel units includes a switching unit, and positions of the switching units of each two adjacent sub-pixel units are opposite; the protrusions of the parallel sides of each of the shading rows correspondingly cover the switching units of the sub-pixel units nearby; and the liquid crystal display panel further includes a plurality of gate lines, a plurality of data lines; the gate lines and the data lines are crossed with each other; the switching unit of each of the sub-pixel units is connected to one of the gate lines and one of the data lines and connected to a pixel electrode; the shading rows of the black matrix are parallel to the gate lines and correspondingly cover the gate lines; and the protrusions of the shading rows correspondingly cover the switching units connected to the gate lines.

In one embodiment of the present invention, the phase retarder rows of the phase retarder film are divided into a plurality of first phase retarder rows and a plurality of second phase retarder rows, and the first phase retarder rows and the second phase retarder rows are alternately arranged; and the first phase retarder rows correspond to odd pixel rows of the pixel array; and the second phase retarder rows correspond to even pixel rows of the pixel array.

The present invention further provides another 3D display device comprising:

a liquid crystal display panel adopting a half-source driving structure and comprising:

a pixel array including a plurality of pixel rows arranged side by side at intervals; and a black matrix including a plurality of shading rows, and the shading rows respectively correspond in position to the intervals between the adjacent pixel rows; and a phase retarder film mounted on the liquid crystal display panel and includes a plurality of phase retarder rows arranged side by side, wherein each of the phase retarder rows has two wave-shaped sides, and each wave-shaped side corresponds in position to one of the shading rows of the black matrix.

In one embodiment of the present invention, each of the pixel rows includes a plurality of sub-pixel units; each of the sub-pixel units includes a switching unit; and positions of the switching units of each two adjacent sub-pixel units are opposite.

In one embodiment of the present invention, each of the phase retarder rows has two wave-shaped sides, and each wave-shaped side has peaks and troughs, and the peaks of the wave-shaped side are positioned at the protrusions of one of the sides of the corresponding shading row; and the troughs of the wave-shaped side are positioned at the protrusions of the other one of the sides of the corresponding shading row.

In one embodiment of the present invention, the liquid crystal display panel includes a plurality of gate lines, a plurality of data lines; the gate lines and the data lines are crossed with each other; the switching unit of each of the sub-pixel units is connected to one of the gate lines and one of the data lines and connected to a pixel electrode; the shading rows of the black matrix are parallel with the gate lines and correspondingly covers the gate lines; and the protrusions of the shading rows correspondingly cover the switching units connected to the gate lines.

In one embodiment of the present invention, in the same pixel row, the switching units of each two adjacent sub-pixel units are connected to the same data line and respectively connected to two adjacent gate lines.

In one embodiment of the present invention, the phase retarder rows of the phase retarder film are divided into a plurality of first phase retarder rows and a plurality of second phase retarder rows, and the first phase retarder rows and the second phase retarder rows are alternately arranged.

In one embodiment of the present invention, the first phase retarder rows correspond to odd pixel rows of the pixel array; and the second phase retarder rows correspond to even pixel rows of the pixel array.

In one embodiment of the present invention, the phase retarder film is a multilayer optical film including a quarter-wave liquid crystal retarder film and a half-wave liquid crystal retarder film.

In one embodiment of the present invention, the liquid crystal display panel further includes a polarizer; and the phase retarder film is mounted on a surface of the polarizer.

The present invention further provides a phase retarder film, and the phase retarder film is used to be mounted on a liquid crystal display panel adopting a half-source driving structure and comprises a plurality of phase retarder rows arranged side by side; each of the phase retarder rows has two wave-shaped sides, and each wave-shaped side corresponds in position to one shading row of a black matrix of the liquid crystal display panel.

The present invention is to use a phase retarder film having peculiar patterns according to pixel driving structure for half-source driving circuits, such that when the phase retarder film is mounted with a positional error, adjacent pixel electrodes in the same pixel row can keep having the same light-passing area relative to the phase retarder rows of the phase retarder film sides so as to further avoid a color washout problem for 3D display system.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
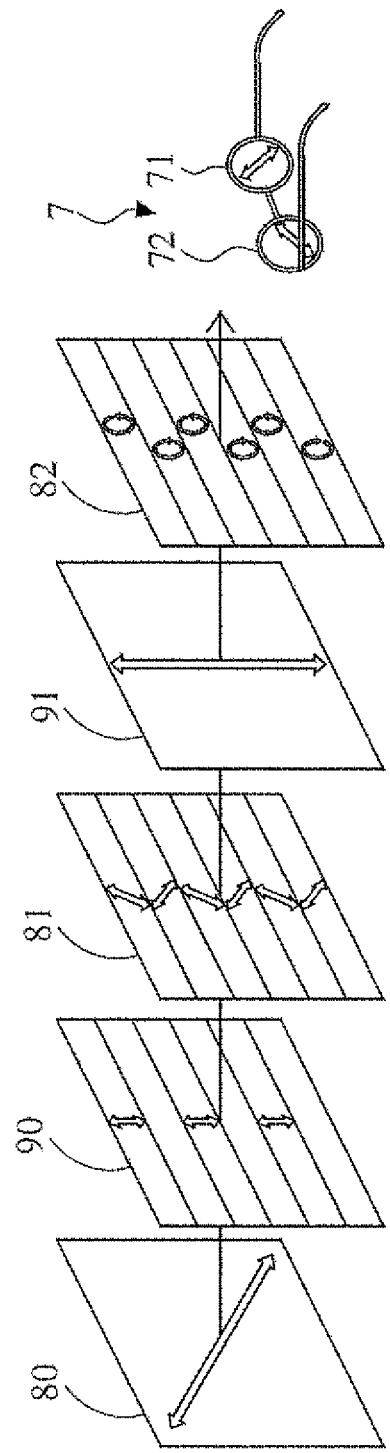
FIG. 1 is a schematic view of polarization status of light in a conventional 3D display system.
Figure 2:
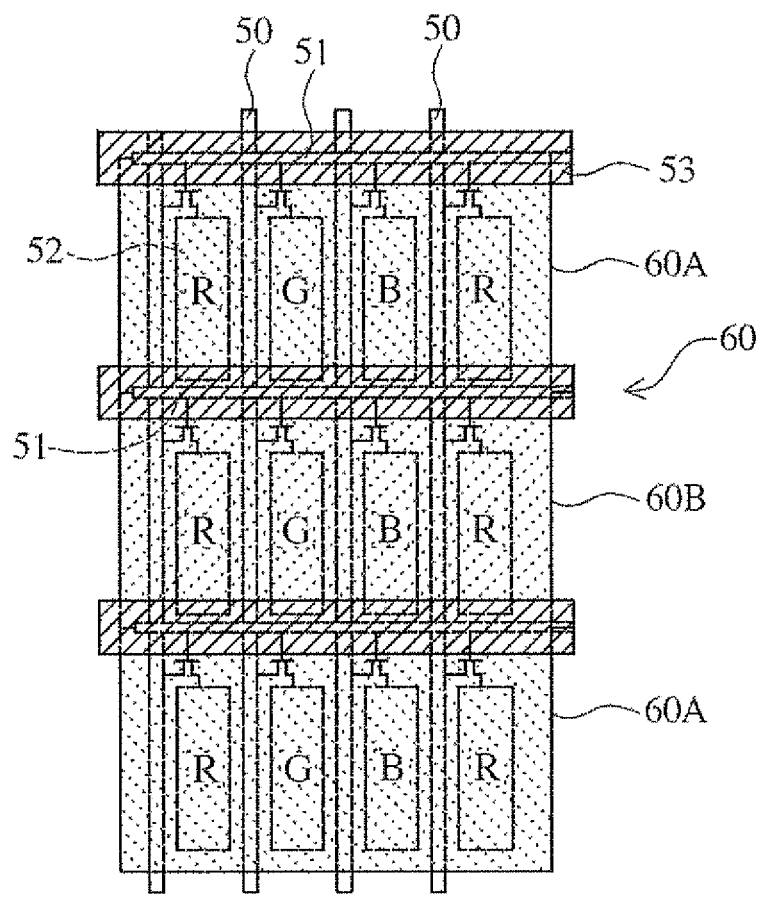
FIG. 2 is a partial schematic view of a phase retarder film correspondingly mounted on a liquid crystal display panel of a conventional 3D display system.
Figure 3:
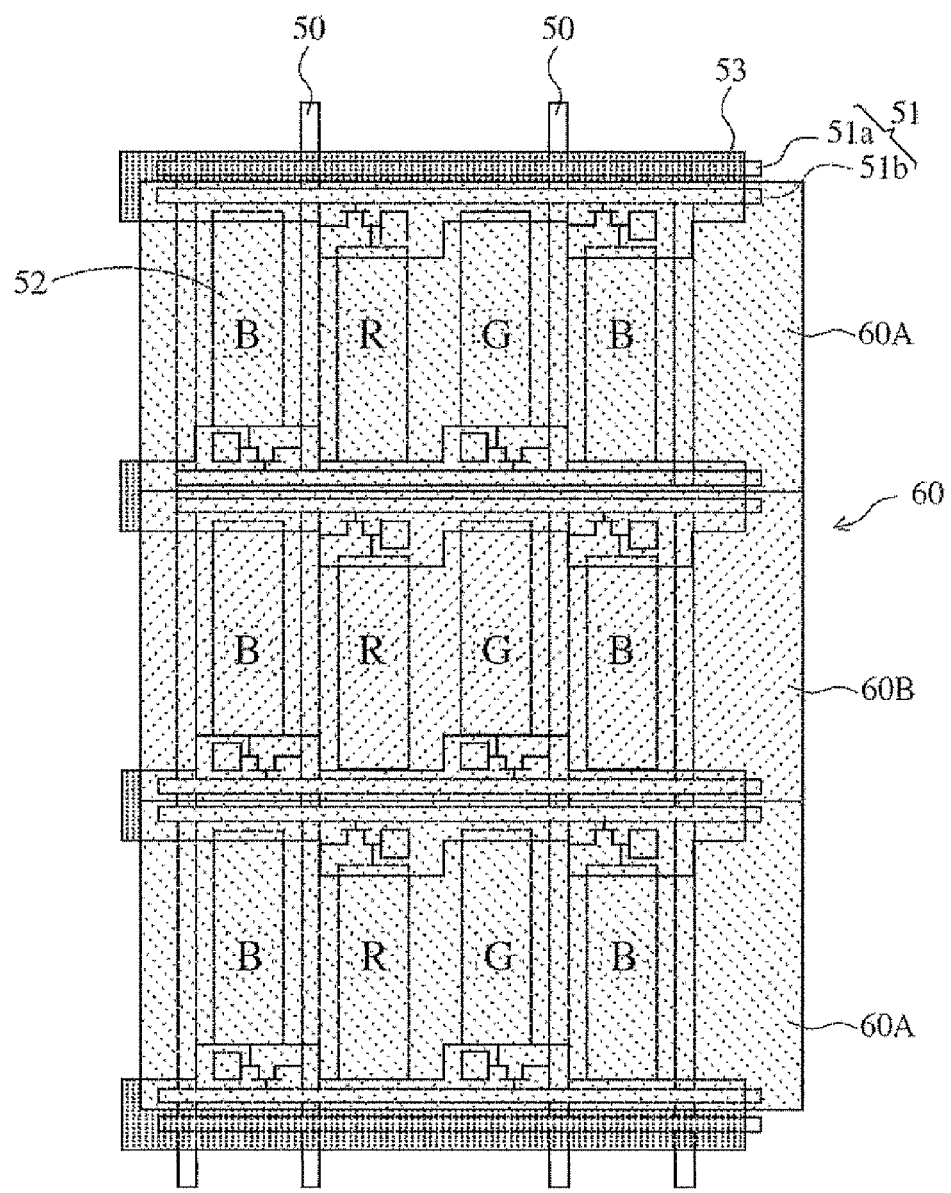
FIG. 3 is a partial schematic view showing that a phase retarder film is correspondingly mounted on a liquid crystal display panel of another conventional 3D display system.
Figure 4:
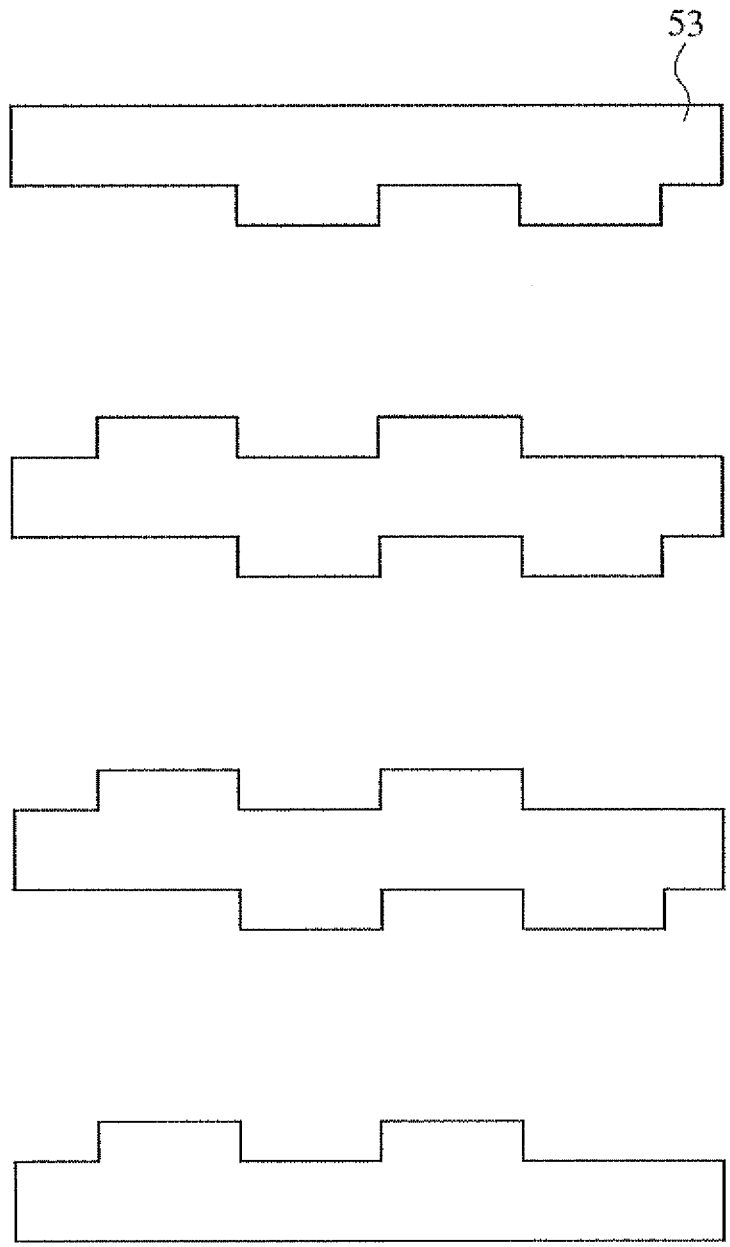
FIG. 4 is a partial schematic view illustrating the shape of black matrix in the 3D display system in FIG. 3.
Figure 5:
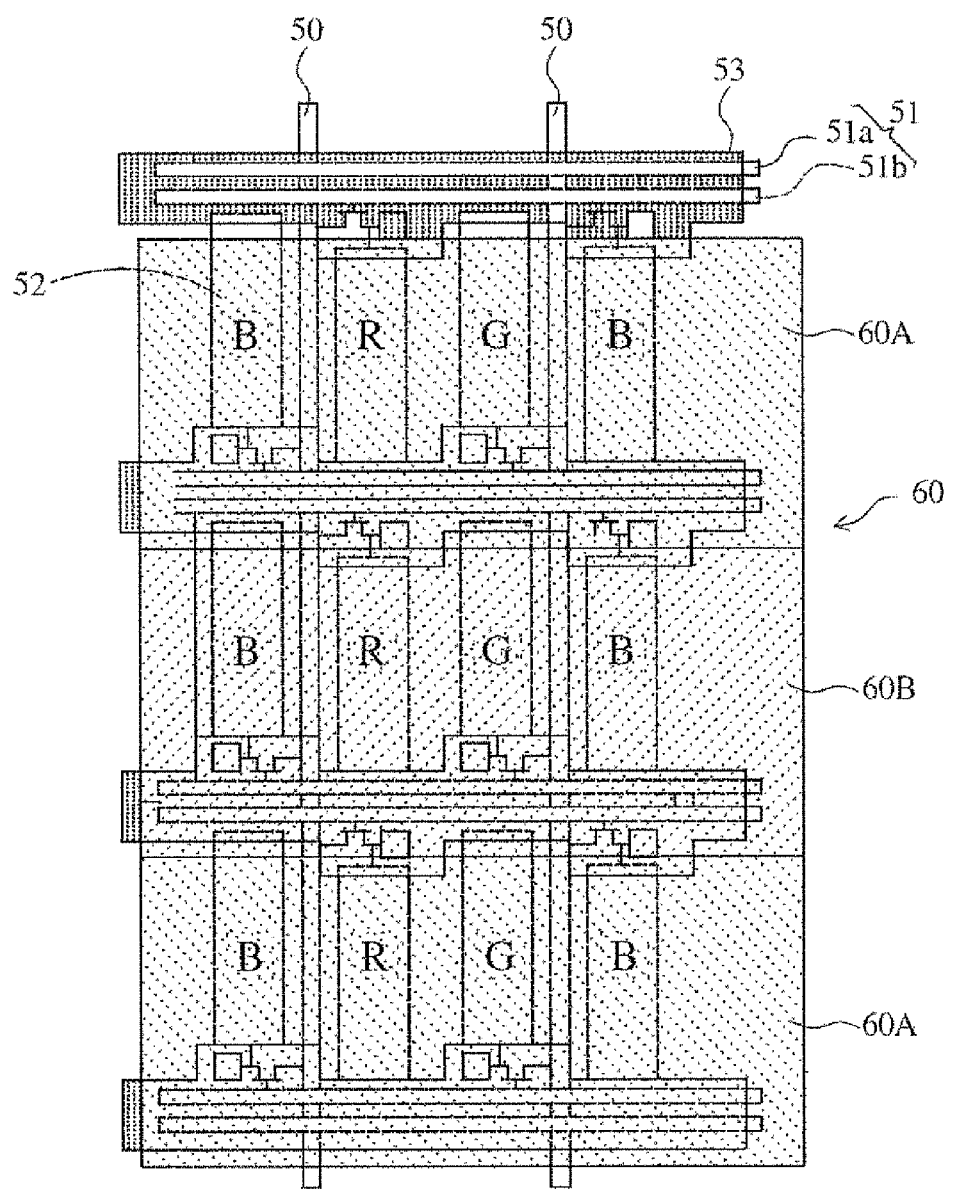
FIG. 5 is a partial schematic view of a phase retarder film being mounted on the liquid crystal display panel of the 3D display system in FIG. 3 with a positional error.
Figure 6:
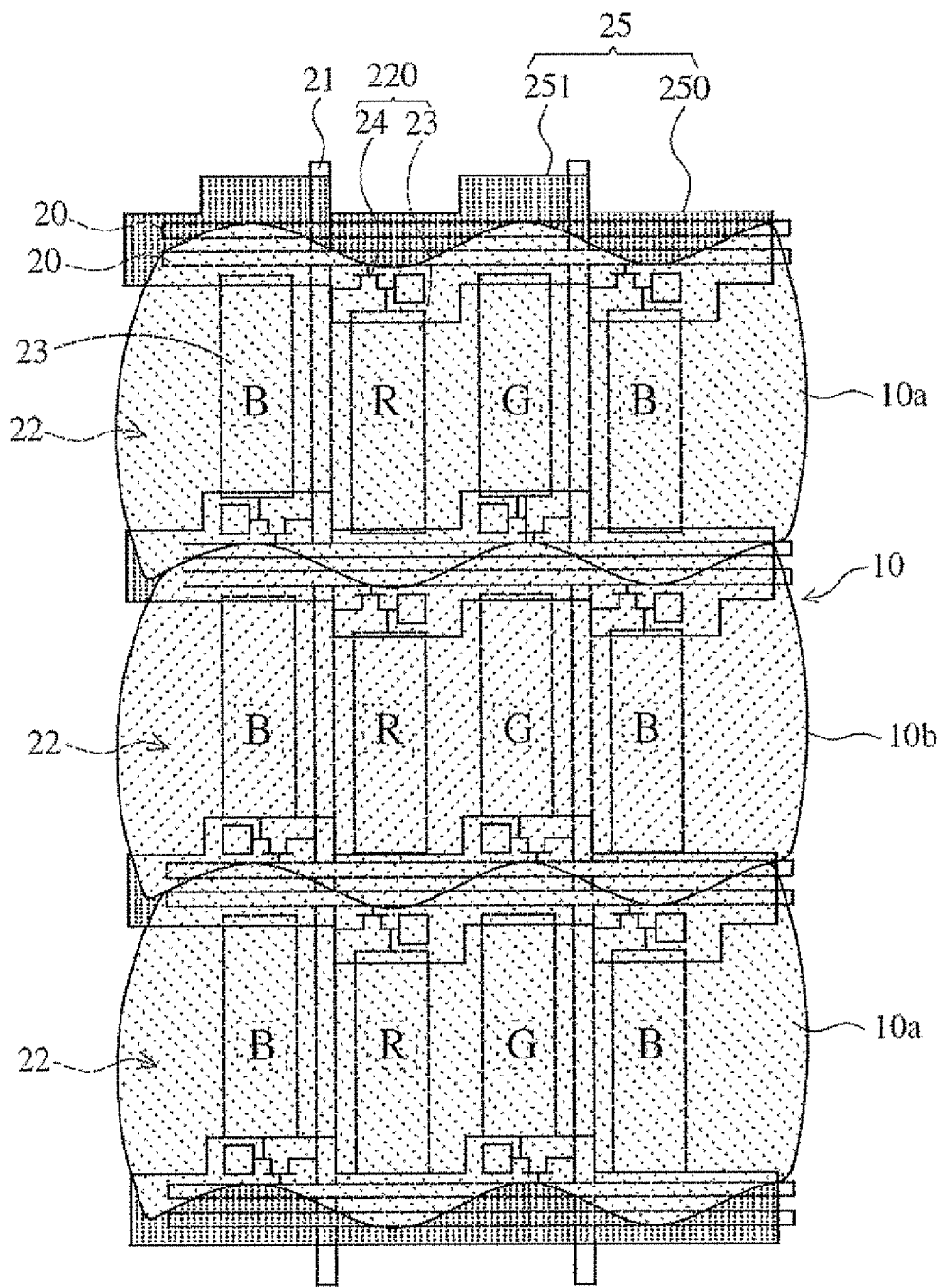
FIG. 6 is a partial schematic view of a phase retarder film correspondingly mounted on a liquid crystal display panel according to a preferred embodiment of a 3D display device in accordance with the present invention.

With reference FIG. 6, FIG. 6 is a partial schematic view of a phase retarder film correspondingly mounted on a liquid crystal display panel according to a preferred embodiment of a 3D display device in accordance with the present invention. The 3D display device of the present invention includes a liquid crystal display panel and a phase retarder film 10. The liquid crystal display panel adopts a half-source driving structure and includes a plurality of gate lines 20, a plurality of data lines 21, a pixel array and a black matrix 25. The gate lines 20 and the data lines 21 are crossed with each other. The pixel array includes a plurality of pixel rows arranged side by side at intervals, and each pixel row 22 includes a plurality of sub-pixel units 220. Each sub-pixel unit 220 includes a pixel electrode 23 and a switching unit 24, wherein the switching unit 24 is preferably a thin-film transistor and connected to one of the gate lines 20 and one of the data lines 21 and connected to the pixel electrode 23.

As shown in FIG. 6, since the liquid crystal display panel of the present invention adopts a half-source driving structure, in the same pixel row 22, the switching units 24 of each two adjacent sub-pixel units 220 are connected to the same data line 21 and respectively connected to two of the gate lines 20. In order to implement the aforementioned circuit arrangement, in this embodiment, positions of the switching units 24 of each two adjacent sub-pixel units 220 are preferably opposite; in more details, for two adjacent sub-pixel units 220, the switching unit 24 of one of the sub-pixel units 220 is disposed at an upper end of the pixel electrode 23 of the sub-pixel units 220 and is connected to one gate line 20 which is adjacent to the upper end of the pixel electrode 23; the switching unit 24 of the other one of the sub-pixel units 220 is disposed at a lower end of the pixel electrode 23 of the other sub-pixel unit 220 and is connected to another gate line 20 which is adjacent to the lower end of the pixel electrode 23 of the other sub-pixel unit 220.

With reference to FIG. 6, the black matrix 25 includes a plurality of shading rows 250, and the shading rows 250 respectively correspond in position to the intervals between the adjacent pixel rows 22, that is, the shading rows 250 are parallel to the gate lines 20 and correspondingly cover the gate lines 20. Furthermore, each of the shading rows 250 has two parallel sides that are parallel to the gate lines 20, wherein each of the sides of each shading row has a plurality of protrusions 251 protruding out therefrom. The protrusions 251 correspondingly cover the switching units 24 of the sub-pixel units 220 nearby; that is, the shading rows 250 correspondingly cover the gate lines 20, and the protrusions 251 of the shading rows 250 correspondingly cover the switching units 24 connected to the gate lines 20.

Figure 7:
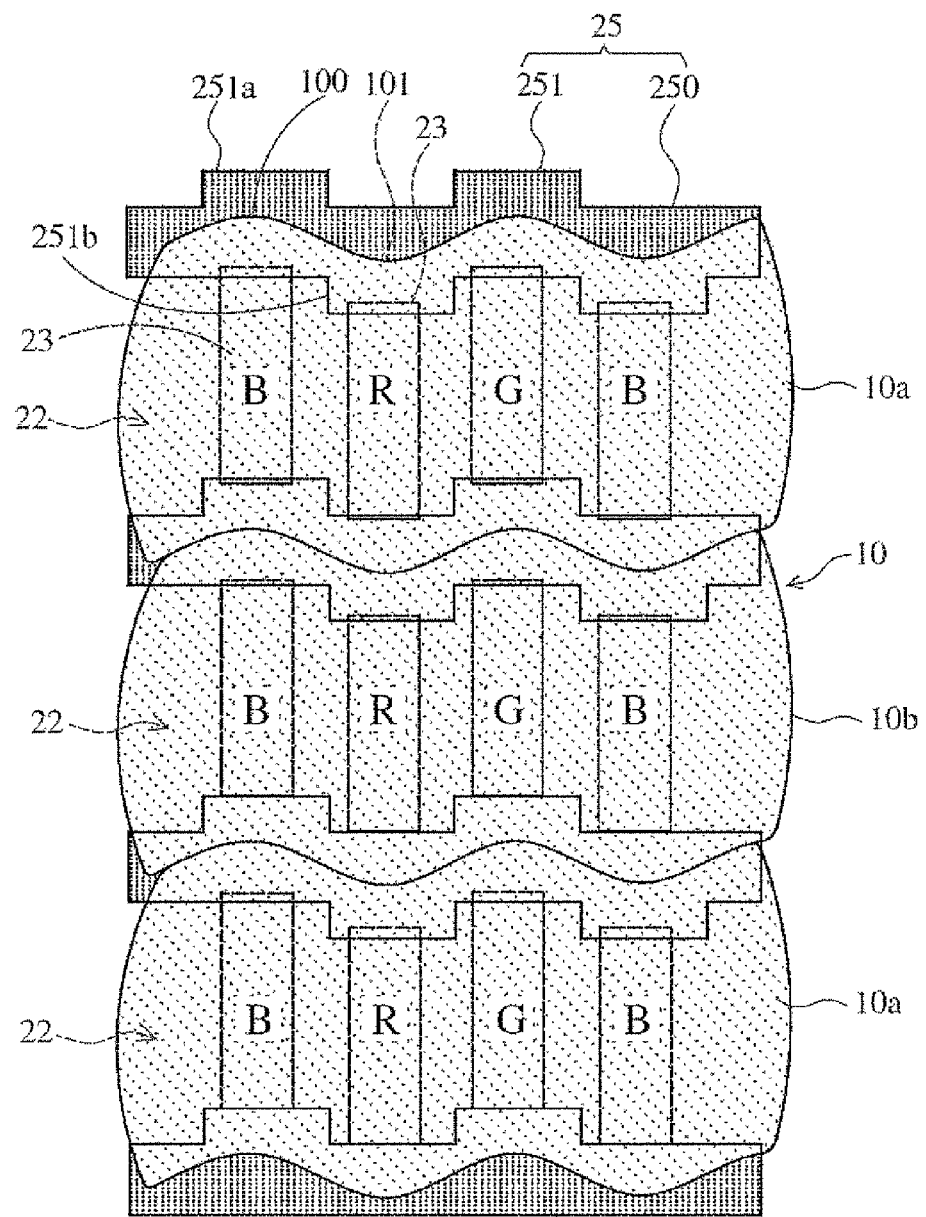
FIG. 7 is a schematic view showing a positional relationship between the phase retarder film and a black matrix according to a preferred embodiment of the 3D display device in accordance with the present invention.

With further reference to FIG. 7, FIG. 7 is a schematic view showing a positional relationship between the phase retarder film and the black matrix according to a preferred embodiment of the 3D display device in accordance with the present invention. As shown in FIGS. 6 and 7, the phase retarder film 10 is mounted on the liquid crystal display panel and includes a plurality of phase retarder rows 10a, 10b arranged side by side, wherein each of the phase retarder rows 10a, 10b has two wave-shaped sides that each wave-shaped side 10a, 10b corresponds in position to one of the shading rows 250 of the black matrix 25. In more detail, as shown in FIG. 7, the side of each of the phase retarder rows 10a, 10b is wave-shaped and thereby has peaks 100 and troughs 101, and the peaks 100 of the wave-shaped side are positioned at the protrusions 251a of one of the sides of the corresponding shading row 250; and the troughs 101 of the wave-shaped side are positioned at the protrusions 251b of the other one of the sides of the corresponding shading row 250. Thus, the sides of the phase retarder rows 10a, 10b are at approximately the same distance from the pixel electrodes in the corresponding pixel row.

Generally speaking, the main structure of the liquid crystal display panel (not shown in figure) comprises a first substrate, a second substrate, a liquid crystal layer, a first polarizer and a second polarizer. The first substrate may be a glass having a color filter or a substrate made of other material. The color filter has photo-resist units with different colors. The pixel array is mounted on the second substrate which is opposite to the first substrate; that is, the gate lines 20, the data lines 21, the pixel electrodes 23 and the switching units 24 are mounted on the second substrate, and the pixel electrodes 23 correspond to the photo-resist units of the color filter. The color filter on the first substrate may further include the black matrix 25 shown in FIG. 6, the shading rows 250 of the black matrix 25 are used to correspondingly cover the gate lines 20 and the switching units 24, and longitudinal shading portions (not shown in the figure) of the black matrix 25 are used to cover the data lines 21. The liquid crystal layer is formed between the first substrate and the second substrate. The first polarizer is mounted on an outer side surface of the first substrate (that is, the light-exiting side of the first substrate). The second polarizer is mounted on an outer side surface of the second substrate (that is, the incident side of the second substrate). The 3D display device further includes a backlight module being mounted at an outer side of the second polarizer to provide a light source to emit lights through the second polarizer. The phase retarder film 10 is mounted on a surface of the first polarizer.

Besides, the phase retarder rows of the phase retarder film 10 are preferably divided into a plurality of first phase retarder rows 10a and a plurality of second phase retarder rows 10b, wherein the first phase retarder rows 10a and the second phase retarder rows 10b are alternately arranged and have different liquid crystal orientations. In order to achieve an object of respectively outputting left-eye images and right-eye images to form 3D images, in this embodiment, the first phase retarder rows 10a correspond to odd pixel rows (or even pixel rows) of the pixel array; and the second phase retarder rows 10b correspond to even pixel rows (or odd pixel rows) of the pixel array. Furthermore, the phase retarder film 10 is preferably a multilayer optical film including a quarter-wave liquid crystal retarder film and a half-wave liquid crystal retarder film.

The operation theory of the 3D display device of the present invention is described as follow:

The polarizer of the liquid crystal display panel converts images outputted from the liquid crystal display panel into linearly polarized images. The linearly polarized images then travel through the phase retarder film 10, wherein the linearly polarized images passing through the first phase retarder rows 10a become left-handed circularly polarized images (or right-handed circularly polarized images); and the linearly polarized images passing through the second phase retarder rows 10b become right-handed circularly polarized images (or left-handed circularly polarized images). A user can wear a pair of polarized glasses to receive the left-handed circularly polarized images and the right-handed circularly polarized images respectively with his two eyes so as to generate three dimensional visual effects.

Figure 8:
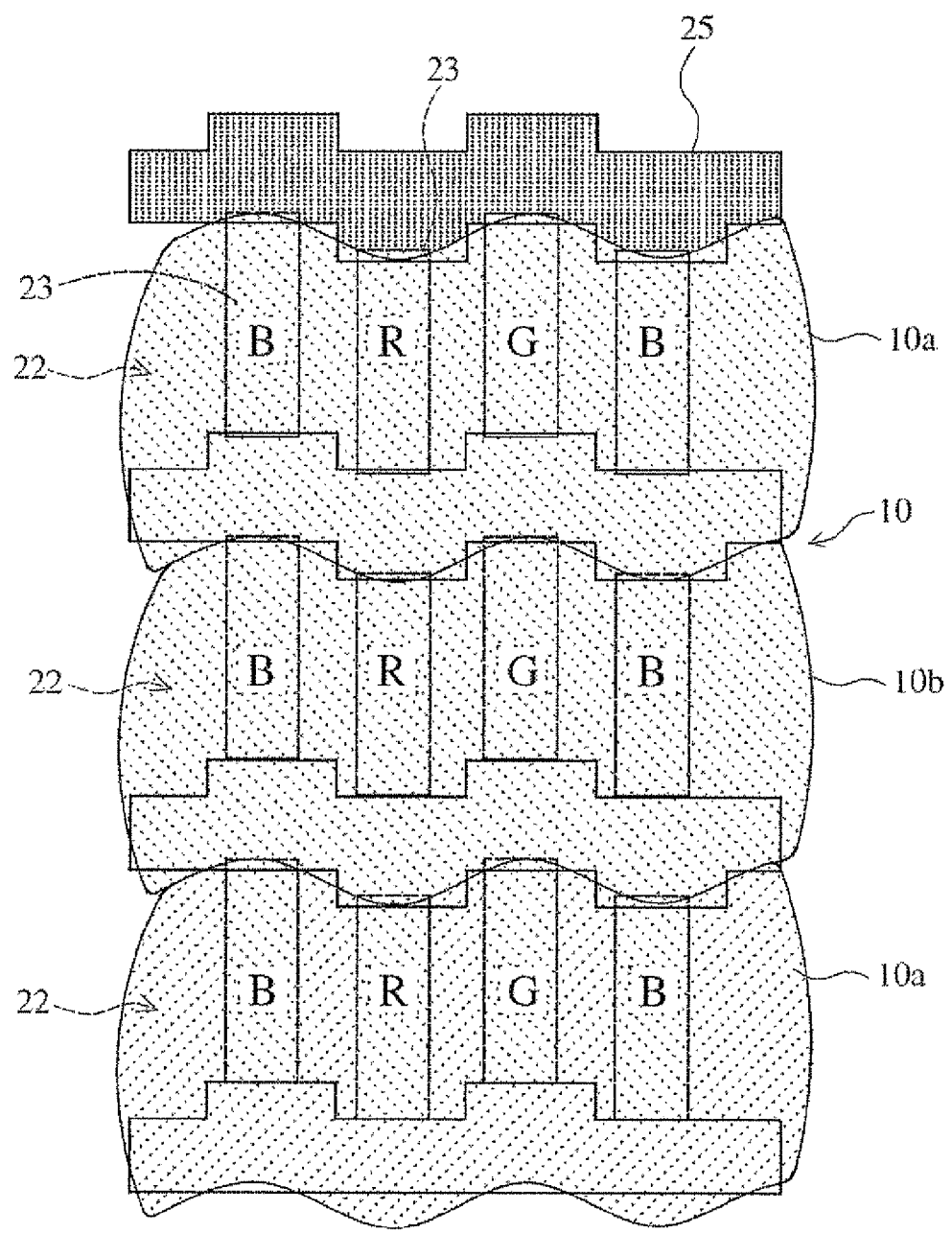
FIG. 8 is a partial schematic view of the phase retarder film being mounted on the liquid crystal display panel of the 3D display system in FIG. 7 with a positional error.

Besides, since the shape of each of the phase retarder rows 10a, 10b of the phase retarder film 10 cooperates with the positions of the protrusions 250 of the black matrix 25 to be wave-shaped, the sides of the phase retarder rows 10a, 10b are at approximately the same distance from all the pixel electrodes in the corresponding pixel row, such that the border of different liquid crystal orientations are at the same distance from the effective light-exiting areas (that is, the pixel electrodes) of the corresponding sub-pixel units. Thus, as shown in FIG. 8, even though the phase retarder film 10 is mounted with a positional error along a longitudinal direction, the pixel electrodes 23 in the same pixel row can still be covered within the range of the same phase retarder rows 10a, 10b to maintain the same light-passing area. Hence, the design of the phase retarder film 10 of the present invention can provide a larger permissible error tolerance range.

By the above description, comparing with the shortcoming of the conventional technology, in accordance with a liquid crystal display panel adopting half-source driving, the present invention uses the phase retarder film having wave-shaped phase retarder rows to increase tolerance to mounting error for the phase retarder film. As long as the phase retarder film is mounted within a permissible error range, the adjacent pixel electrodes in the same pixel row can still have the same light-passing area relative to the phase retarder rows so as to avoid a color washout problem for the 3D display system.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A 3D display device comprising:
a liquid crystal display panel adopting a half-source driving structure and comprising:
a pixel array including a plurality of pixel rows arranged side by side at intervals; and
a black matrix including a plurality of shading rows, and the shading rows respectively correspond in position to the intervals between the adjacent pixel rows, and each of the shading rows has two parallel sides, and each of the parallel sides has a plurality of protrusions protruding out therefrom; and
a phase retarder film mounted on the liquid crystal display panel and includes a plurality of phase retarder rows arranged side by side, wherein each of the phase retarder rows has two wave-shaped sides that each wave-shaped side corresponds in position to one of the shading rows of the black matrix, and each wave-shaped side has peaks and troughs, and the peaks of the wave-shaped side are positioned at the protrusions of one of the sides of the corresponding shading row; and the troughs of the wave-shaped side are positioned at the protrusions of the other one of the sides of the corresponding shading row.

2. The 3D display device as claimed in claim 1, wherein each of the pixel rows includes a plurality of sub-pixel units, and each of the sub-pixel units includes a switching unit, and positions of the switching units of each two adjacent sub-pixel units are opposite;
the protrusions of the parallel sides of each of the shading rows correspondingly cover the switching units of the sub-pixel units nearby; and
the liquid crystal display panel further includes a plurality of gate lines, a plurality of data lines; the gate lines and the data lines are crossed with each other; the switching unit of each of the sub-pixel units is connected to one of the gate lines and one of the data lines and connected to a pixel electrode; the shading rows of the black matrix are parallel to the gate lines and correspondingly cover the gate lines; and the protrusions of the shading rows correspondingly cover the switching units connected to the gate lines.

3. The 3D display device as claimed in claim 2, wherein the phase retarder rows of the phase retarder film are divided into a plurality of first phase retarder rows and a plurality of second phase retarder rows, and the first phase retarder rows and the second phase retarder rows are alternately arranged; and
the first phase retarder rows correspond to odd pixel rows of the pixel array; and the second phase retarder rows correspond to even pixel rows of the pixel array.

4. A 3D display device comprising:
a liquid crystal display panel adopting a half-source driving structure and comprising:
a pixel array including a plurality of pixel rows arranged side by side at intervals; and
a black matrix including a plurality of shading rows, and the shading rows respectively correspond in position to the intervals between the adjacent pixel rows; and
a phase retarder film mounted on the liquid crystal display panel and includes a plurality of phase retarder rows arranged side by side, wherein each of the phase retarder rows has two wave-shaped sides, and each wave-shaped side corresponds in position to one of the shading rows of the black matrix.

5. The 3D display device as claimed in claim 4, wherein each of the pixel rows includes a plurality of sub-pixel units; each of the sub-pixel units includes a switching unit; and positions of the switching units of each two adjacent sub-pixel units are opposite.

6. The 3D display device as claimed in claim 5, wherein each of the phase retarder rows has two wave-shaped sides, and each wave-shaped side has peaks and troughs, and the peaks of the wave-shaped side are positioned at the protrusions of one of the sides of the corresponding shading row; and the troughs of the wave-shaped side are positioned at the protrusions of the other one of the sides of the corresponding shading row.

7. The 3D display device as claimed in claim 5, wherein the liquid crystal display panel includes a plurality of gate lines, a plurality of data lines; the gate lines and the data lines are crossed with each other; the switching unit of each of the sub-pixel units is connected to one of the gate lines and one of the data lines and connected to a pixel electrode; the shading rows of the black matrix are parallel with the gate lines and correspondingly covers the gate lines; and the protrusions of the shading rows correspondingly cover the switching units connected to the gate lines.

8. The 3D display device as claimed in claim 7, wherein in the same pixel row, the switching units of each two adjacent sub-pixel units are connected to the same data line and respectively connected to two of the gate lines.

9. The 3D display device as claimed in claim 4, wherein the phase retarder rows of the phase retarder film are divided into a plurality of first phase retarder rows and a plurality of second phase retarder rows, and the first phase retarder rows and the second phase retarder rows are alternately arranged.

10. The 3D display device as claimed in claim 9, wherein the first phase retarder rows correspond to odd pixel rows of the pixel array; and the second phase retarder rows correspond to even pixel rows of the pixel array.

11. The 3D display device as claimed in claim 9, wherein the phase retarder film is a multilayer optical film including a quarter-wave liquid crystal retarder film and a half-wave liquid crystal retarder film.

12. The 3D display device as claimed in claim 4, wherein the liquid crystal display panel further includes a polarizer; and the phase retarder film is mounted on a surface of the polarizer.

13. A phase retarder film being used to be mounted on a liquid crystal display panel adopting a half-source driving structure, wherein the phase retarder film comprises a plurality of phase retarder rows arranged side by side; each of the phase retarder rows has two wave-shaped sides, and each wave-shaped side corresponds in position to one shading row of a black matrix of the liquid crystal display panel.

* * * * *